March 14, 1939. V. ROOSA ET AL 2,150,520
POLYPHASE GENERATOR SPEED REGULATOR
Filed Nov. 29, 1937
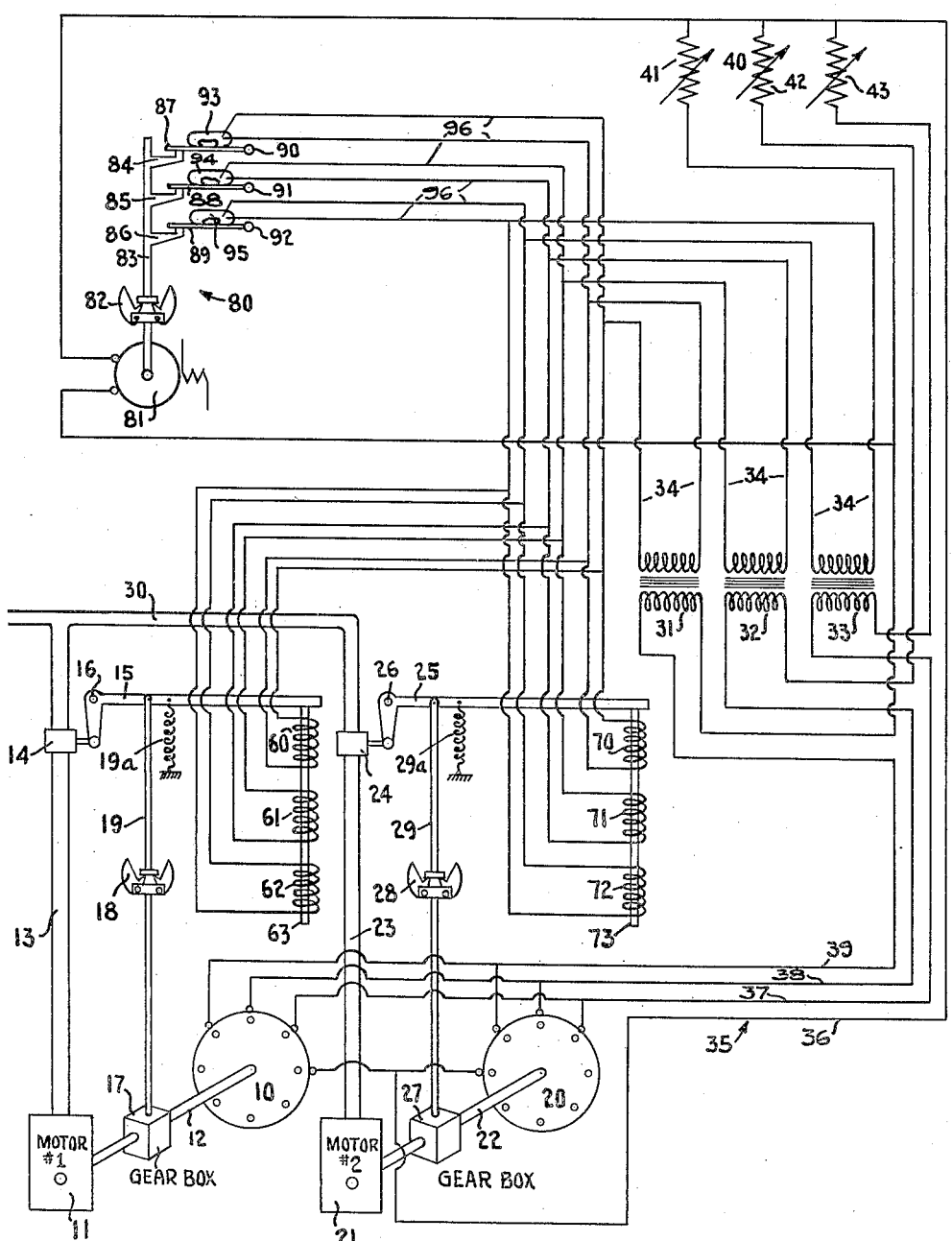
VERNON ROOSA
EUGENE SILBER
INVENTORS
BY *Victor J. Evans & Co.*
ATTORNEYS Patented Mar. 14, 1939

2,150,520

UNITED STATES PATENT OFFICE 2,150,520

POLYPHASE GENERATOR SPEED REGULATOR

Vernon Roosa, Dobbs Ferry, and Eugene Silber, New York, N. Y.

Application November 29, 1937, Serial No. 177,118

4 Claims. (Cl. 290—4)

This invention relates to improvements in devices for controlling and regulating the speed of prime movers and more particularly to devices for automatically controlling the speed of polyphase electrical generator units associated with a prime mover.

It is a major object of the present invention to provide apparatus and means for controlling the speed of a unit comprising a polyphase generator and a prime mover whereby the speed of the generator is regulated in accordance with the electrical load upon the polyphase transmission line associated with the generator.

It is also a major object of the present invention to provide a speed control system of the type hereinbefore referred to which is actuated instantaneously by variations in the electrical load upon the transmission network associated with the generator instead as heretofore necessitating a momentary decrease in the speed of the generator whereby means are actuated causing an increase in speed of the prime mover. That is to say in speed control devices of the type referred to according to the prior art, imposition of a load upon the electrical transmission network associated with the generator was reflected in a decrease of speed of the generator-prime mover unit due in a major part to the increased torque necessary to drive a loaded generator as compared with the torque required to drive an unloaded generator. It will be noted that in the systems according to the prior art an appreciable time interval elapsed after the imposition of a load upon the system before the speed of the generator was restored to normal.

As hereinbefore referred to it is a major object of the present invention to at least largely minimize the time interval elapsing between the imposition or variation of or in load upon the transmission network associated with the generator before the speed of the generator is returned to normal.

It is also an object of the present invention to provide a novel means for preventing overspeeding of a unit comprising generator and prime mover when a plurality of generators are employed to feed the same electrical power transmission network.

It is another feature of the device according to the present invention that means are provided for substantially instantaneously increasing the speed of the unit comprising generator and prime mover when the speed of said unit is decreased by reason of increase in load.

It is also an object of the present invention to provide a novel system of varying and controlling speed of a unit comprising prime mover and polyphase generator wherein the speed of the unit can be kept substantially constant or varied in accordance and in direct proportion with variations in the sum of loads imposed upon different phases of the polyphase electrical transmission network associated with said generator.

Other objects and advantages of the present invention will be apparent to those skilled in the art during the course of the following detailed description and from a consideration of the accompanying drawing taken in the light of said description.

The drawing illustrates in a substantially diagrammatic manner a preferred embodiment of the present invention showing its use in conjunction with a system including a pair of triple phase generators associated with prime movers and connected to a transmission network including variable and different loads upon each of the phases thereof.

In order to facilitate a more complete understanding of the matter of the present invention the specific embodiment thereof diagrammatically illustrated in the accompanying drawing will be hereinafter described, but it is to be clearly understood that the embodiment illustrated is purely by way of example and is not limitative.

A pair of triple phase electrical generators 10 and 20 are associated with prime movers 11 and 21, respectively, by means including drive shafts 12 and 22. The prime movers 11 and 21 can be any sources of power subject to control such, for example, as internal combustion engines, hydro-turbines, steam turbines, electrical motors or other substantial equivalents. In the illustrated embodiment of the invention it is intended that the prime movers be internal combustion engines, the fuel supply of which passes through ducts 13 and 23 wherein are positioned throttles 14 and 24, said ducts communicating with each other by a line 30 at a point past the throttles and being connected to a fuel supply (not shown). The throttles 14 and 24 are controlled by means including an L-shaped lever arm associated with each throttle, said lever arms being generally designated by 15 and 25 and being pivoted at the points 16 and 26. Gear boxes 17 and 27 carried on shafts 12 and 22 are arranged to drive control means such as governors 18 and 28, preferably of the centrifugal type, whereby as the speeds of the shafts 12 and 22 vary, the vertical movement of sliding bar-like members 19 and 29 is altered in a manner proportional to the variations in speed. Said bar-like members 19 and 29 are associated at upper extremities thereof with the lever arms 15 and 25 substantially as shown, whereby as the speed of the shafts 12 and 22 is increased the bar-like members 19 and 29 are moved upwardly thereby imparting counterclockwise rotative movement to the lever arms 15 and 25 and, by at least partially closing the throttles 14 and 24, altering the supply of fuel passing through the ducts 13 and 23 and thereby decreasing the speeds of the prime movers 11 and 21. It will be noted that springs 19a and 29a are connected to the lever arms 15 and 25 and to portions of the frame work whereby the lever arms normally tend to move in a clockwise direction thereby exerting pressure upon the bar-like members 19 and 29.

An electrical power transmission network generally designated at 35 comprises a neutral line 36 and power lines 37, 38 and 39. It will be noted that in the illustrated embodiment the network is a triple phase system and is fed jointly by the generating units 10 and 20. Loads generally designated at 40 are imposed upon the different portions of the transmission network, the load 41 being imposed upon the portion of the network comprising the lines 36 and 39, the load 42 being imposed upon the portion of the network comprising the lines 38 and 36, and the load 43 being imposed upon the lines 36 and 37. Each of these loads is variable independently of the other loads and in a manner which is not readily prognosticatable. It will be noted that transformers generally designated at 31, 32 and 33 are associated with the current transmission network, one of the windings of each of these transformers being inserted in and forming a part of one of the lines, the transformer 31 for example being associated with the line 39, the transformer 32 being associated with the line 38, and the transformer 33 being associated with the line 37. Hence, it will be apparent that the current in the output lines generally designated at 34 of the transformers 31, 32 and 33 will be proportional to the current flowing in the various phases of the electrical transmission network, each transformer being adapted to vary in output accordingly as the current in different phases of the network is varied.

In loaded electrical transmission networks of the type referred to substantially instantaneous increase in load upon one phase is reflected by a substantially instantaneous increase in the current flowing in the circuit and a substantially instantaneous decrease in electromotive force between the lines of that phase. In other words, if current and voltage measuring devices were incorporated in a loaded electrical transmission network it would be observed that an increase in load would cause an increase in the current drawn and a decrease in the voltage of the line. Accordingly, in the embodiment of the present invention herein illustrated, an increase in the load 41 would cause an increase in the current flowing in the line 39 and a decrease in the potential difference between the lines 39 and 36. The same would be true of increases in the other loads in which case if load 42 were increased the current flowing in line 38 would be increased and the potential difference between the line 38 and the neutral line 36 would be decreased and, likewise, increase in the load 43 would be reflected in increase of the current flowing in the line 37 and decrease in the potential difference existing between the lines 36 and 37. Inasmuch as windings of the transformers 31, 32 and 33 form a part of the lines 39, 38 and 37, it will be apparent that the current sent into the output line 34 of each of the transformers will vary in accordance with variations in the load and that the potential difference between the output lines will be proportionally decreased as the load is increased in the respective lines.

Solenoids 60 and 70 are connected to the output lines of the transformer 31; solenoids 61 and 71 are connected to the output lines of the transformer 32 and solenoids 62 and 72 are connected to the output lines of the transformer 33. The solenoids in each of the sets 60—61—62 and 70—71—72 is arranged one above the other whereby copper bar-like members 63 and 73 can be positioned and slidably mounted within the cores of the solenoids. Portions of the copper bar are provided with electromagnetic materials such as iron, cobalt, nickel or the like, carried thereon whereby passage of current through the solenoids serves to cause movement or exert pressure upon the bar-like members. The bar-like members 63 and 73 are attached at an upper extremity thereof to the lever arms 15 and 25 respectively, the various moving parts of each of the systems being adjusted whereby current passing through the solenoids is reflected in a tendency toward clockwise rotative movement of the lever arms thereby opening the throttles and increasing the fuel supply to the prime movers thereby accelerating the speed of the generators. As hereinbefore referred to the output lines of the transformers 31, 32 and 33 carry current having relationship to the loads, generally designated at 40, imposed upon the electrical transmission network, the current of said output lines varying substantially instantaneously and in a manner proportional to variations in the different loads 41, 42 and 43. Accordingly, inasmuch as the solenoids are connected to the output lines of the several transformers and inasmuch as the pull exerted by a solenoid is proportional to the current flowing through same, it will be apparent that a variation in the load upon the lines 36 and 39 will be reflected in a proportional change in the pull exerted by the solenoids 60 and 70 and hence in the pull exerted by the bar-like members 63 and 73 whereby the throttles 14 and 24 are actuated, thereby substantially preventing monopolization or hogging of the load by any generator feeding the power transmission network. In a similar manner the solenoids 61 and 71 are dependent upon the load in the lines 36 and 38, hence a variation in the load 42 upon these lines is reflected in a variation in the pull exerted by these solenoids upon the bar-like members 63 and 73; likewise with the solenoids 62 and 72 associated with the lines 36 and 37 and the load 43. Assuming therefore for purposes of example that the load 41 is increased, a greater current will flow in the lines 36 and 39 thereby causing a greater current to flow through to transformer 31 and causing a greater pull to be exerted by the solenoids 60 and 70 thereby opening the throttles 14 and 24. This, it will be noted, is substantially an instantaneous reaction of the members composing the system to a change in the load in the system and does not depend upon a decrease in the speeds at which the armatures of the generators are traveling due to an increase in load whereby the governors 18 and 28 are actuated with corresponding movement of the lever arms 15 and 25. It will be apparent, of course, that the torque action of the solenoids about the points 16 and 26 should be sufficient to overcome the counter-torque of the members 19 and 29 acting against the governors 18 and 28.

It will be apparent then, that decrease in speed of the units comprising the prime mover and generator is substantially prevented by operation of the hereinbefore described devices. Means will now be described whereby over-speeding of the units is substantially prevented as, for example, when loads are removed from the lines which in devices according to the prior art often result in substantial momentary increases in the speeds of the generators.

Means for preventing over-speeding comprises the apparatus generally designated at 80 and includes a synchronous single phase motor 81 connected to one of the phases of the electrical transmission network, which in the illustrated embodiment are lines 36 and 39. It is preferred that the synchronous motor employed have a relatively high speed in order to facilitate more delicate control of the prime mover inasmuch as a small increase in the speed at which the generators supplying the line are operated will be reflected in a relatively small increase in the frequency of the current delivered to the line, but this small increase in frequency will be materially magnified by a relatively large increase in the speed of the synchronous motor 81. The armature shaft of the synchronous motor is associated with and operates a governor or similar device 82, whereby variation in the frequency of the current supplied to the electrical power transmission network, generally designated at 35, is reflected in reciprocating movement of the bar-like member 83. The member 83 carries a plurality of projecting arms 84, 85 and 86 arranged to abut against and lift plates 87, 88 and 89 pivoted at places 90, 91 and 92, respectively. Plates 87, 88 and 89 carry switching means, preferably mercury switches 93, 94 and 95, respectively, whereby as the bar-like member 83 moves upwardly due to increase in speed of the armature shaft of the synchronous motor 81 the switches 93, 94 and 95 are actuated thereby closing the circuits in the lines generally designated at 96. It will be apparent, of course, that the positions of the projecting arms 84, 85 and 86 can be adjusted upon the member 83, whereby the switches will be closed only when the speed of the synchronous motor armature shaft exceeds a predetermined value. It is also notable that, if desired, other types of switching means, for example carbon point switches, can be substituted for the mercury switches hereinabove referred to.

The switches 93, 94 and 95 are connected by means of the lines generally designated at 96 across the output lines of the transformers 31, 32 and 33, respectively, whereby as the speed of the synchronous motor exceeds a certain predetermined value the switches are closed thereby short-circuiting the output lines of the transformers 31, 32 and 33 and rendering the effect of the solenoids 60—61—62 and 70—71—72 substantially nugatory. It will, of course, be apparent that short-circuiting of the output lines of the transformers 31, 32 and 33 as aforesaid results in the imposition of additional load upon the lines 39, 38 and 37, respectively, which increase in load is reflected in a decrease in the speed of armature rotation in the generating units 10 and 20 thereby preventing, or at least largely minimizing, tendencies toward over-speeding of said generators and their associated prime movers.

Hence, it will be seen that the rotative speed of the generators 10 and 20 actuated with the prime movers 11 and 21 is substantially closely controlled by the aforesaid means, the solenoids serving to substantially instantaneously increase the speed of the prime mover as the load upon the electrical power transmission network associated with the generators is increased and the synchronous motor serving to substantially instantaneously decrease the speed of the prime mover by increasing the load with simultaneous disconnection of the solenoids from the line.

It will be apparent, of course, to those skilled in the art that this control system can be applied to other types of current supply systems than those hereinbefore described without departure from the scope of the present invention. In using a polyphase system having more phases or less phase than three, a solenoid and associated electrical equipment is provided for each phase and a solenoid is provided on each phase for each prime mover. That is to say, in a 5-phase system where three generators were used, each independently actuated by a prime mover, fifteen solenoids would be used and similarly for other types of electrical systems. Only one synchronous motor, however, is necessary inasmuch as an increase in the speed of the generator will cause an increase in the frequency of the current of each phase, thereby actuating the overspeeding control herein described.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In a device of the type described for controlling the speed of each of a plurality of electrical current supplying units, each of said units comprising a polyphase alternating current generator and a prime mover connected with and driving said generator, mechanically operated means for regulating the speed of said prime mover, the generator of each of said units being connected to and feeding a polyphase electrical power transmission network, at least some of the phases of said network having loads thereon different in degree and subject to variations substantially unprognosticatable, electrically controlled means associated with and adapted to independently and individually actuate the several mechanically operated means for regulating the speed of the several prime movers, said electrically controlled means being associated with, connected to and forming part of said polyphase electrical power transmission network and being actuated substantially instantaneously by and in a degree proportional to any and all variations in the electrical load on the lines comprising said network, and substantially instantaneously actuable electrically controlled means for preventing said units comprising generator and prime mover from operating at a speed greater than a predetermined value.

2. In a device of the type described for controlling the speed of each of a plurality of electrical current supplying units, each of said units comprising a polyphase alternating current generator and a prime mover connected with and driving said generator, mechanically operated means for regulating the speed of said prime mover, the generator of each of said units being connected to and feeding a polyphase electrical power transmission network, at least some of the phases of said network having loads thereon different in degree and subject to variations substantially unprognosticatable, electrically controlled means associated with and adapted to independently and individually actuate the several mechanically operated means for regulating the speed of the several prime movers, said electrically controlled means being associated with, connected to and forming part of said polyphase electrical power transmission network and being actuated substantially instantaneously by and in a degree proportional to any and all variations in the electrical load on the lines comprising said network, said electrically controlled means comprising a plurality of units equal in number to the number of phases in the system, each unit comprising a current transformer, one winding of said transformer being connected in and forming a part of one of the current carrying lines whereby all current passing through said line passes through said winding, solenoids, corresponding in number to the number of prime movers, directly connected to the other winding of said transformer and energizable by and in a degree proportional to the current flowing in said line, whereby each prime mover is provided with a plurality of solenoids each one of which has an electrical flux proportional to and instantly varying in accordance with variations in the current flowing in one phase of the power transmission network, the solenoids of each prime mover being arranged coaxially relative to each other, an electromagnetically sensitive armature on each prime mover directly mechanically connected to the mechanical means for controlling the speed thereof and passing through all the said solenoids associated with said prime mover whereby current passing through any of said solenoids operates said mechanical speed control means in a degree proportional to the substantially instantaneous values of the electrical loads on the lines of all phases in the power transmission network and the current flowing in said lines, and substantially instantaneously actuable electrically controlled means for preventing said units comprising generator and prime mover from operating at a speed greater than a predetermined value.

3. In a device of the type described for controlling the speed of each of a plurality of electrical current supplying units, each of said units comprising a polyphase alternating current generator and a prime mover connected with and driving said generator, mechanically operated means for regulating the speed of said prime mover, the generator of each of said units being connected to and feeding a polyphase electrical power transmission network, at least some of the phases of said network having loads thereon different in degree and subject to variations substantially unprognosticatable, electrically controlled means associated with and adapted to independently and individually actuate the several mechanically operated means for regulating the speed of the several prime movers, said electrically controlled means being associated with, connected to and forming part of said polyphase electrical power transmission network and being actuated substantially instantaneously by and in a degree proportional to any and all variations in the electrical load on the lines comprising said network, and substantially instantaneously actuable electrically controlled means for preventing said units comprising generator and prime mover from operating at a speed greater than a predetermined value, said means comprising a relatively high speed single phase synchronous motor connected to the lines of one of the phases of said electrical power transmission network, a speed sensitive device actuated by and mechanically connected to said synchronous motor, a plurality of electrical switches, equal in number to the number of phases in the power transmission network and operable by said speed sensitive device when the speed of the synchronous motor exceeds a predetermined value, one of said switches being connected across the output lines of each of the said current transformers and adapted to short-circuit same whereby the solenoids are substantially prevented from functioning and the transformers impose an additional electrical load upon the power transmission network with concomitant and resultant decrease in speed of generators supplying current to said network.

4. In a device of the type described for controlling the speed of each of a plurality of electrical current supplying units, each of said units comprising a polyphase alternating current generator and a prime mover connected with and driving said generator, mechanically operated means for regulating the speed of said prime mover, the generator of each of said units being connected to and feeding a polyphase electrical power transmission network, at least some of the phases of said network having loads thereon different in degree and subject to variations substantially unprognosticatable, electrically controlled means associated with and adapted to independently and individually actuate the several mechanically operated means for regulating the speed of the several prime movers, said electrically controlled means being associated with, connected to and forming part of said polyphase electrical power transmission network and being actuated substantially instantaneously by and in a degree proportional to any and all variations in the electrical load on the lines comprising said network, said electrically controlled means comprising a plurality of units equal in number to the number of phases in the system, each unit comprising a current transformer, one winding of said transformer being connected in and forming a part of one of the current carrying lines whereby all current passing through said line passes through said winding, solenoids, corresponding in number to the number of prime movers, directly connected to the other winding of said transformer and energizable by and in a degree proportional to the current flowing in said line, whereby each prime mover is provided with a plurality of solenoids each one of which has an electrical flux proportional to and instantly varying in accordance with variations in the current flowing in one phase of the power transmission network, the solenoids of each prime mover being arranged coaxially relative to each other, an electromagnetically sensitive armature on each prime mover directly mechanically connected to the mechanical means for controlling the speed thereof and passing through all the said solenoids associated with said prime mover whereby current passing through any of said solenoids operates said mechanical speed control means in a degree proportional to the substantially instantaneous values of the electrical loads on the lines of all phases in the power transmission network and the current flowing in said lines, substantially instantaneously actuable electrically controlled means for preventing said units comprising generator and prime mover from operating at a speed greater than a predetermined value, said means comprising a relatively high speed single phase synchronous motor connected to the lines of one of the phases of said electrical power transmission network, a speed sensitive device actuated by and mechanically connected to said synchronous motor, a plurality of electrical switches, equal in number to the number of phases in the power transmission network and operable by said speed sensitive device when the speed of the synchronous motor exceeds a predetermined value, one of said switches being connected across the output lines of each of the said current transformers and adapted to short-circuit same whereby the solenoids are substantially prevented from functioning and the transformers impose an additional electrical load upon the power transmission network with concomitant and resultant decrease in speed of generators supplying current to said network.

VERNON ROOSA.
EUGENE SILBER.